Aug. 27, 1957 S. LANDELL 2,804,346
WHEEL COVER
Filed Aug. 24, 1953
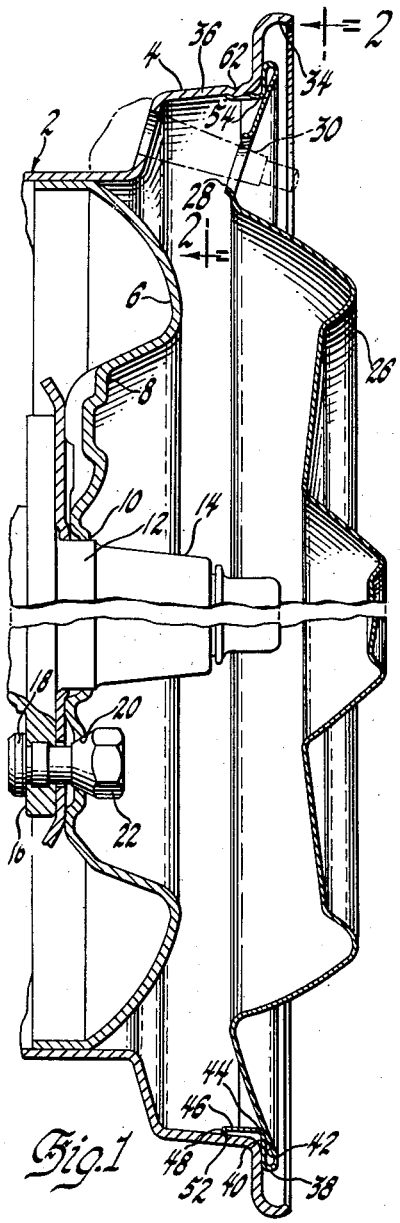
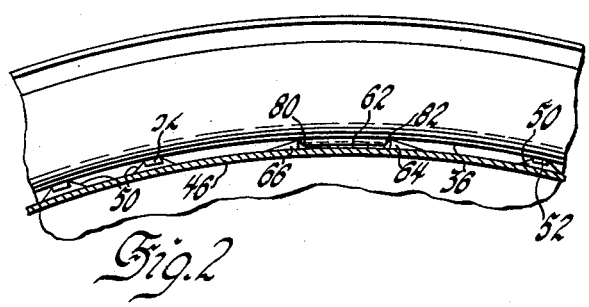
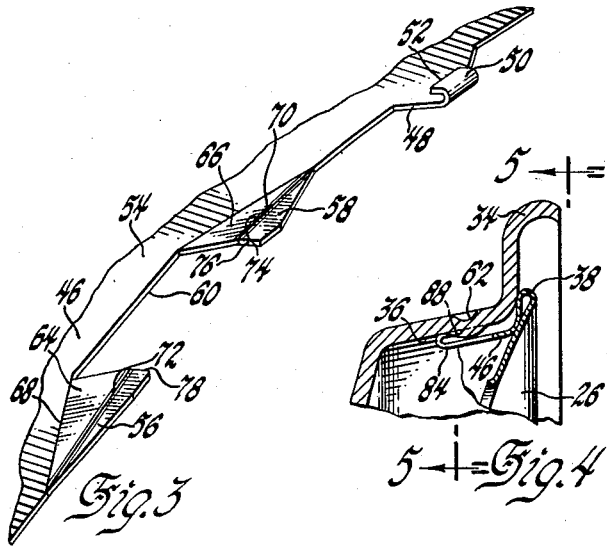
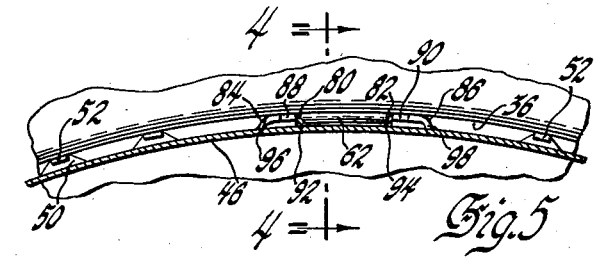
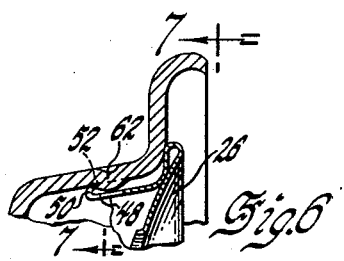
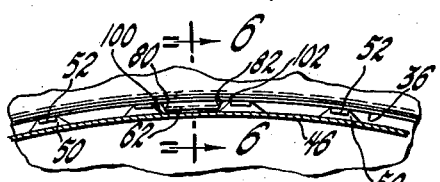
INVENTOR
Stanford Landell
BY
ATTORNEY though said to a corporation of United States Patent Office 2,804,346
Patented Aug. 27, 1957

2,804,346
WHEEL COVER

Stanford Landell, Fayetteville, N. Y., assignor to General Motors Corporation, Detroit, Mich., a corporation of Delaware Application August 24, 1953, Serial No. 375,938

1 Claim. (Cl. 301—37)

This invention relates to improvements in vehicle wheel structures. More particularly, the invention relates to ornamental and protective covers therefor and novel means for retaining the cover on the wheel.

An object of the invention is to provide a vehicle wheel and cover therefor having cooperating interengaging parts adapted to prevent relative turning therebetween.

In accordance with the general features of the invention, there is provided a vehicle wheel having a generally axially extending intermediate rim portion, a circular wheel cover having retaining means adapted for gripping engagement in nesting relation with the inner periphery of said rim portion, and means on said axially extended portion of said wheel adapted for interfitting engagement with the retaining means for said cover whereby torque resulting from either rapid acceleration or deceleration of the wheel will not rotatably displace the cover.

Other objects and advantages and features of the invention will become apparent from the following description, reference being had to the accompanying drawings wherein:

Fig. 1 is an enlarged front elevational view, in section, of a vehicle wheel and a cover member therefor, taken in a plane substantially midway of the wheel.

Fig. 2 is an enlarged fragmentary side elevational view taken substantially along the lines 2—2 of Fig. 1.

Fig. 3 is an enlarged fragmentary perspective view of a portion of the wheel cover illustrating one form of the novel retaining means.

Fig. 4 is a fragmentary front elevational view, partly in section of a modified form of the invention and taken along the lines 4—4 of Fig. 5.

Fig. 5 is an enlarged fragmentary radial sectional view, taken substantially along the lines 5—5 of Fig. 4.

Fig. 6 is a view similar to Fig. 4 taken along the lines 6—6 of Fig. 7 showing another form of the invention, and Fig. 7 is a view similar to Fig. 5 taken substantially along the lines 7—7 of Fig. 6.

In the drawings, the numeral 2 designates a conventional wheel structure comprising an annular multi-flanged tire rim 4 having secured centrally therein a generally circular pressed metal wheel body 6. Centrally thereof, wheel body 6 is provided with a dished portion 8 having a flanged central aperture 10 adapted for slidable positioning over the hub portion 12 of a vehicle axle 14. Integrally formed on axle 14 is a wheel bolt-on flange 16 having a plurality of radially arranged wheel bolts 18 secured therein. Wheel bolts 18 are adapted to extend outwardly through complementary radially arranged apertures 20 formed in dished portions 8 for engagement by wheel nut 22. Upon tightening nuts 22, wheel body 6 is drawn axially inwardly into rigid engagement with flange 16.

Disposed in covering relation over the outer surface of wheel 2 is a sheet metal disc or cover 26 having an aperture 28 formed therein through which a tire valve stem 30, shown in dotted lines, extends. As seen in Fig. 1, cover 26 is of a diameter less than the diameter of the terminal rim flange 34, but greater than the diameter of intermediate rim flange 36. At its outer margin 38, cover 26 is inturned to provide a circular flange 40 which extends radially inwardly in converging relation with the rear surface 42 of cover 26 and at its radially inner margin 44 is turned axially rearwardly to provide an axially extending cover retaining flange 46. At spaced intervals circumferentially thereof, flange 46 is notched to provide a series of fingers 48. Fingers 48 are turned intermediately thereof to extend axially forwardly and radially outwardly from the surface of flange 46 to provide flexible rim engaging portions 50 having terminal edge portions 52 adapted for biting engagement with intermediate flange 36 of rim 4. Fingers 48 are disposed in substantially equally spaced relation throughout substantially the entire circumference of flange 46, but are omitted from the portion 54 of flange 46 radially adjacent valve stem aperture 28.

In accordance with one form of the invention, the terminal edge of portion 54 of flange 46 is provided with reversely similar axially extending integral tab portions 56 and 58. Formed between tabs 56 and 58 is a generally rectangular relatively wide notch 60 which extends into the mid-portion of flange 46. Notch portion 60 is adapted to be positioned in straddling relation with a generally rectangular boss 62 struck down from the inner periphery of intermediate flange 36. In order to provide optimum interfitting engagement between notch 60 and boss 62, triangular portions 64 and 66 of flange 46 are bent up along the lines 68 and 70 and tabs 56 and 58 are bent down along the lines 72 and 74, as shown in Fig. 3, whereby edged portions 76 and 78 of tabs 56 and 58 lie in planes radially outwardly offset from and parallel to the surface of flange 46 and engage the shoulders 80 and 82 formed at the juncture of boss 62 and flange 36. As seen best in Fig. 2, it will be apparent that any rotational thrust on tabs 56 and 58 resulting from wheel torque will be received by tabs 56 and 58 generally in the direction of their maximum inherent rigidity, thereby substantially reducing the possibility of bending thereof as a result of excessive torque.

In Figs. 4 and 5, there is shown a modification of the invention wherein the flange 46 is provided with rim engaging portions 50 similar to those previously described. However, the portion 54 of flange 46 radially adjacent valve stem aperture 28 is provided with finger portions 84 and 86 generally similar to but broader than the remaining series of fingers disposed circumferentially on flange 46. Finger portions 84 and 86 differ from finger portions 50 in that the outer terminal portions 88 and 90 are bent radially inwardly to lie in substantially parallel relation with the surface of flange 46 and thus resiliently bear against flange 36 but afford no biting engagement therewith. However, opposed inner edged portions 92 and 94 lie in planes parallel with and outwardly offset from the plane of the flange to provide straddling engagement with the shoulders 80 and 82 of boss 62 formed on flange 36. As seen in Fig. 5, the outer edges 96 and 98 of fingers 84 and 86 become progressively broader toward the body of flange 46 in order to provide greater structural strength.

In Figs. 6 and 7, there is shown a further modification of the invention wherein the flange 46 is provided with identical rim engaging fingers 50 spaced equally around the entire circumference thereof. In this embodiment, boss 62 extends downwardly in the space between adjacent fingers 50. It will be apparent that upon rotational movement of the cover relative to the wheel, the inner edges 100 and 102 of flexible rim engaging portions 50 will engage the shoulders 80 and 82 of boss 62 and thus limit relative movement between the cover and the wheel.

From the foregoing it will be seen that there has been provided a wheel cover structure having novel and highly efficient cover retaining means for preventing rotation of the cover on the wheel, thereby preventing damage to the valve stem.

While several embodiments have been shown and described, it will be apparent that other changes, modifications and variations may be effected therein. It is, therefore, to be understood that it is not intended to limit the invention to the embodiments shown, but only by the scope of the claim which follows.

I claim:

In a wheel structure, a tire rim having an intermediate annular flange, an inwardly extending lug formed on said flange, said lug having generally parallel shoulders normal to the surface of said flange, a wheel cover for the outer side of said wheel, said cover having an annular flange including a generally axially rearwardly extending portion adapted for a nesting relation with the intermediate flange of said wheel and a notched terminal edged portion forming a plurality of spaced resilient fingers bent forwardly for gripping engagement with said intermediate flange to prevent axial outward movement of said cover, the axially rearwardly directed portion of said cover flange being offset radially outwardly to lie in close proximity with and parallel to the surface of said annular flange of said wheel, and means forming an axially rearwardly opening notch in said offset portion adapted for straddling cooperation with the parallel shoulders of said lug to prevent relative rotation between said cover and said wheel.

References Cited in the file of this patent

UNITED STATES PATENTS

| | | |
|---|---|---|
| 2,368,228 | Lyon | Jan. 3, 1945 |
| 2,624,628 | Lyon | Jan. 6, 1953 |
| 2,624,636 | Lyon | Jan. 6, 1953 |
| 2,660,478 | Lyon | Nov. 24, 1953 |
| 2,660,479 | Lyon | Nov. 24, 1953 |
| 2,669,487 | Horn | Feb. 16, 1954 |
| 2,733,104 | Lyon | Jan. 31, 1956 |